United States Patent
Lee (10) Patent No.: US 10,576,708 B2
(45) Date of Patent: Mar. 3, 2020

(54) COMPLEMENTARY PAPER TUBE AND FLAT PLATE

(71) Applicant: Wistron Corporation, New Taipei (TW)

(72) Inventor: Charlie C L Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 332 days.

(21) Appl. No.: 15/595,958

(22) Filed: May 16, 2017

(65) Prior Publication Data
US 2018/0141709 A1    May 24, 2018

(30) Foreign Application Priority Data

Nov. 24, 2016    (CN) .......................... 2016 1 1060618

(51) Int. Cl.
| | |
|---|---|
| *B32B 1/08* | (2006.01) |
| *B65D 19/02* | (2006.01) |
| *B65D 71/00* | (2006.01) |
| *B65D 19/00* | (2006.01) |
| *B32B 5/14* | (2006.01) |
| *B32B 1/02* | (2006.01) |
| *B65D 19/38* | (2006.01) |

(52) U.S. Cl.
CPC .................. *B32B 1/08* (2013.01); *B32B 1/02* (2013.01); *B32B 5/142* (2013.01); *B65D 19/00* (2013.01); *B65D 19/02* (2013.01); *B65D 19/38* (2013.01); *B65D 71/0096* (2013.01); *B65D 2571/00061* (2013.01)

(58) Field of Classification Search
CPC .... B32B 1/00; B32B 1/02; B32B 1/08; B32B 5/14; B32B 5/142; B32B 5/145; B65D 19/00; B65D 19/02; B65D 19/36; B65D 19/38
See application file for complete search history.

(56) References Cited

U.S. PATENT DOCUMENTS

2005/0126947 A1    6/2005    Holley, Jr.

FOREIGN PATENT DOCUMENTS

| TW | 200716453 | 5/2007 |
|---|---|---|
| TW | M361483 | 7/2009 |

OTHER PUBLICATIONS

"Office Action of Taiwan Counterpart Application," with English translation thereof, dated May 22, 2017, p. 1-p. 6.

*Primary Examiner* — Walter Aughenbaugh
(74) *Attorney, Agent, or Firm* — JCIPRNET (57) ABSTRACT

A complementary paper tube adapted to fill a remaining space on a cargo pallet includes sidewall portions, a straight auxiliary tearing line and circular auxiliary tearing lines. The side wall portions are disposed adjacently to each other. The straight auxiliary tearing line surrounds the sidewall portions. The circular auxiliary tearing lines are disposed on the sidewall portions and respectively connected to the straight auxiliary tearing line. A portion of the area surrounded by the circular auxiliary lines is adapted to be torn away, so as to form circular openings. The complementary paper tube is adapted to be torn into an upper tube and a lower tube. In addition, a flat plate adapted to form the complementary paper tube is also mentioned.

10 Claims, 6 Drawing Sheets

COMPLEMENTARY PAPER TUBE AND FLAT PLATE

CROSS-REFERENCE TO RELATED APPLICATION

This application claims the priority benefit of China application serial no. 201611060618.2, filed on Nov. 24, 2016. The entirety of the above-mentioned patent application is hereby incorporated by reference herein and made a part of this specification.

BACKGROUND OF THE INVENTION

1. Field of the Invention

The present invention generally relates to a complementary paper tube, in particular, to a separable complementary paper tube and a flat plate for forming the complementary paper tube.

2. Description of Related Art

When factories of the manufacturers of the electronic devices ship out the goods, the cargo pallets with fixed loading areas are usually used to load and stack the goods. Due to the goods come with different sizes, there is usually some fragmented remaining space left on the cargo pallets after the goods are stacked and loaded, and the size of the remaining space is not big enough to accommodate any other goods.

Generally speaking, the above-mentioned fragmented remaining space is usually stuffed with the complementary paper tube. The vertical heights of the complementary paper tubes are usually designed according to the desired stacking levels of the goods. For example, when the goods are stacked as the upper and lower layers, the vertical heights of the complementary paper tubes can be two layers. However, in terms of the above-mentioned examples, when the goods are merely stacked in a one-layer manner. That is, as the stacking layers of the goods are fewer than usual, the vertical heights of the complementary paper tube cannot be effectively and rapidly changed and adjusted. In addition, if the complementary paper tubes are directly cut by the cutters, the structural strength of the complementary paper tube may be affected, and thereby the complementary paper tubes cannot provide effective support and are not able to meet the safety working standards in the factories.

SUMMARY OF THE INVENTION

The invention provides a complementary paper tube, and the height thereof can be adjusted according to the layers of the stacking goods on the cargo pallet.

The invention provides a flat plate which can be folded into a complementary paper tube that can be torn into an upper tube and a lower tube.

The complementary paper tube adapted to fill a remaining space on a cargo pallet includes sidewall portions, a straight auxiliary tearing line and circular auxiliary tearing lines. The side wall portions are disposed adjacently to each other. The straight auxiliary tearing line surrounds the sidewall portions. The circular auxiliary tearing lines are disposed on the sidewall portions and respectively connected to the straight auxiliary tearing line. A portion of the area surrounded by the circular auxiliary lines is adapted to be torn away, so as to form circular openings. The complementary paper tube is adapted to be torn into an upper tube and a lower tube. The flat plate adapted to form the complementary paper tube includes a plurality of first folding lines. The first folding lines are parallel to each other, perpendicular to the straight auxiliary tearing lines, and separate out the side wall portions and an adhering portion on the flat plate. The circular auxiliary tearing lines are respectively located between the adjacent first folding lines and separate out the circular openings on the flat plate, the flat plate is adapted to be folded along the first folding lines and one of the side wall portions is adapted to be adhered on the adhering portion, so as to from the complementary paper tube.

According to an embodiment of the invention, the complementary paper tube further includes a plurality of rhombus-shaped openings, respectively located at a plurality of edges of the complementary paper tube. The rhombus-shaped openings are respectively connected to the at least one straight auxiliary tearing line and the circular auxiliary tearing lines.

According to an embodiment of the invention, the complementary paper tube further includes a pair of cover portions, respectively covering a top portion and a bottom portion of the complementary paper tube.

According to an embodiment of the invention, the pair of the cover portions respectively have inserting holes and the at least one of the side wall portions has a plurality of inserting portions disposed corresponding to the inserting holes, the inserting portions are adapted to be inserted into the inserting holes respectively, so as to respectively hold the pair of the cover portions among the side wall portions.

According to an embodiment of the invention, sizes and structures of the upper tube and the lower tube are substantially the same.

According to an embodiment of the invention, the flat plate further includes a plurality of rhombus-shaped auxiliary tearing lines, disposed at intersections of the first folding lines and the straight auxiliary tearing line. The rhombus-shaped auxiliary tearing lines separate out the rhombus-shaped openings on the flat plate.

According to an embodiment of the invention, the flat plate further includes a pair of second folding lines, disposed at two opposite sides of one of the side wall portions and perpendicular to the first folding lines. The pair of the second folding lines separate out the pair of the cover portions on the flat plate.

According to an embodiment of the invention, the flat plate further includes a plurality of third folding lines, respectively perpendicular to the first folding lines. The flat plate has a plurality of inserting portions, foldably embedded on one of the side wall portions through the third folding lines. The inserting portions are adapted to be folded and inserted into the inserting holes.

According to an embodiment of the invention, the straight auxiliary tearing line and the circular auxiliary tearing lines together separate out the upper tube and the lower tube on the flat plate.

In view of the foregoing, in the embodiments of the invention, the flat plate can be folded into a complementary paper tube. The complementary paper tube has a plurality of the side wall portions, the straight auxiliary tearing line and the circular auxiliary tearing lines. The straight auxiliary tearing line surrounds the side wall portions. The circular auxiliary tearing lines are located on the side wall portions and connected to the straight auxiliary tearing line respectively. In the embodiments of the invention, the circular auxiliary tearing lines can be torn to form the circular openings. In addition, the operator can grab and apply forces to the edges of the circular openings, so as to tear the complementary paper tube into the upper tube and the lower tube along the straight auxiliary tearing line.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
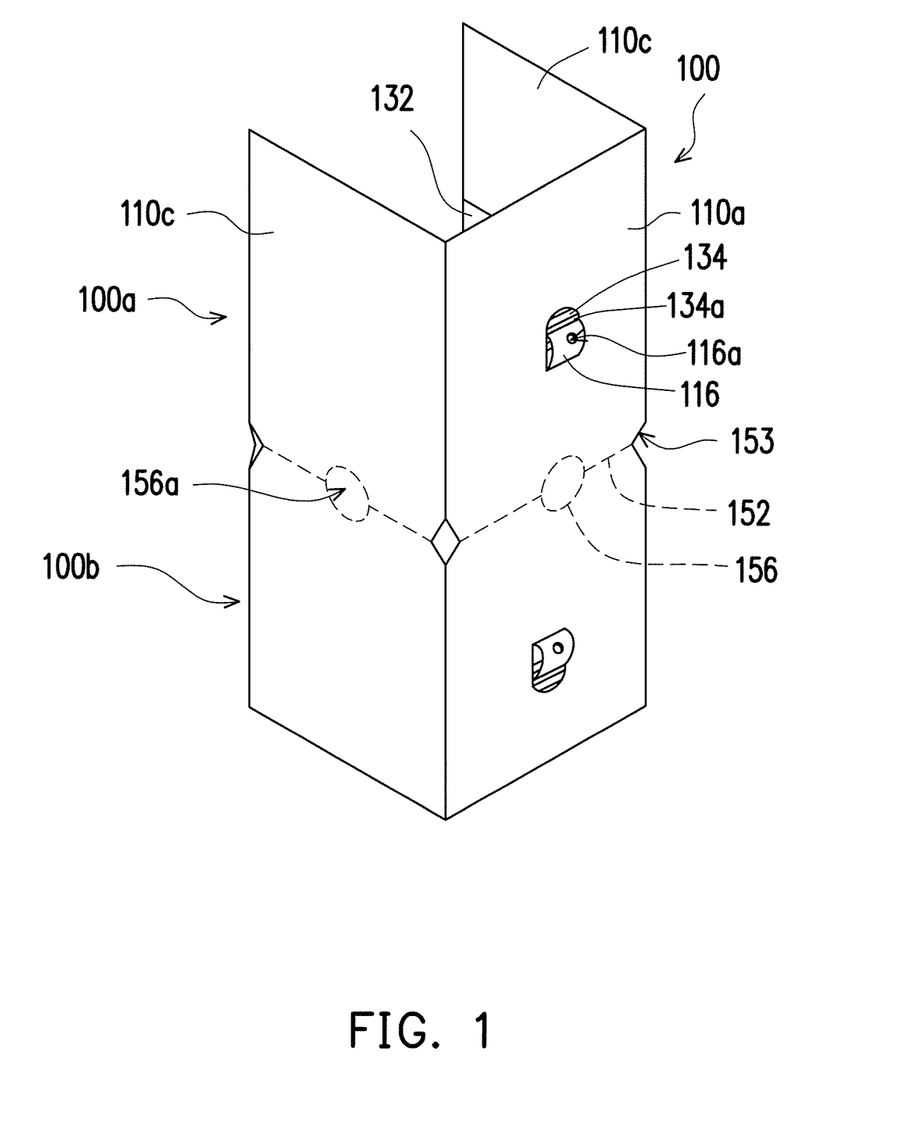
FIG. 1 is a schematic diagram illustrating a complementary paper tube according to an exemplary embodiment.
Figure 2:
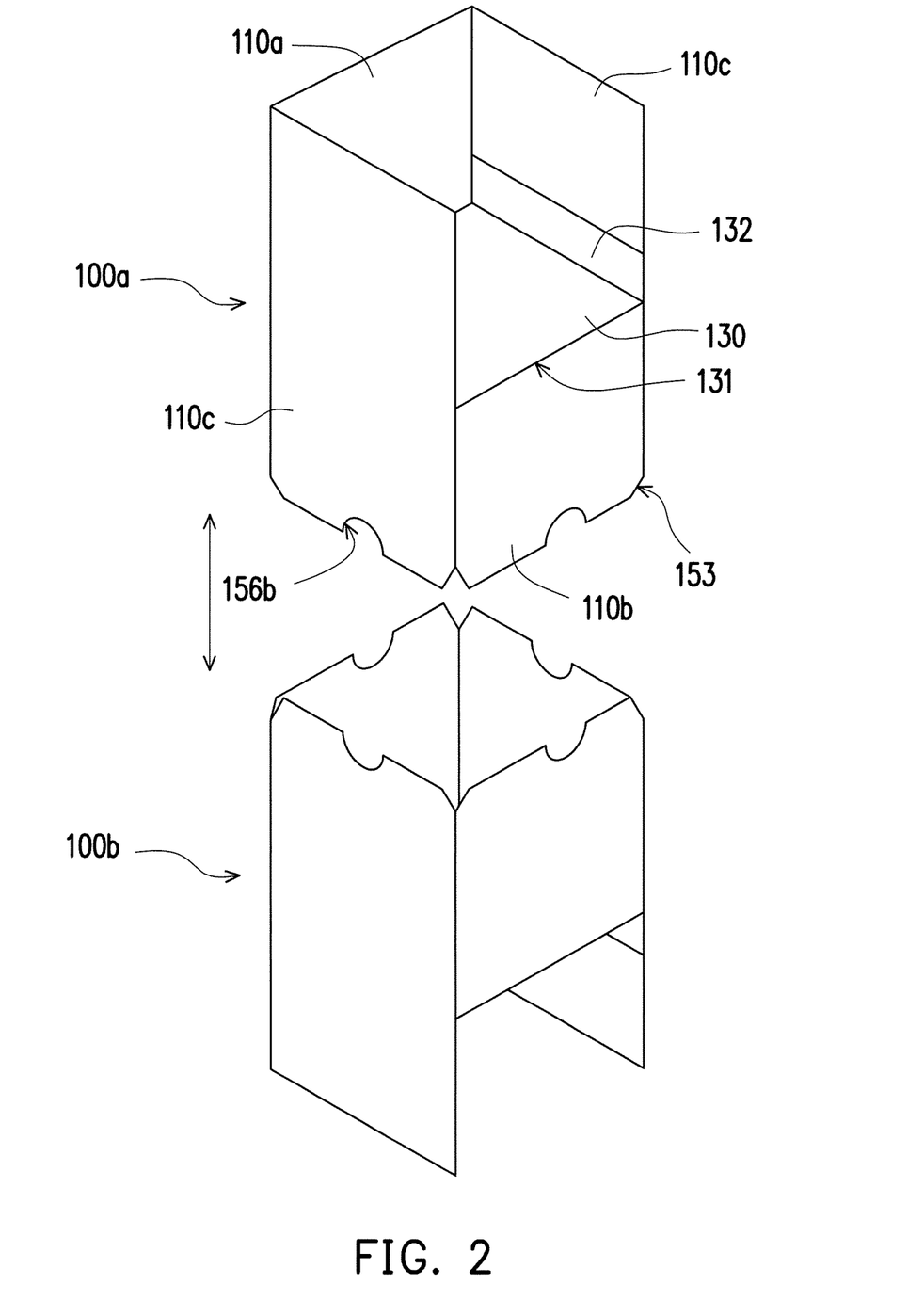
FIG. 2 illustrates some embodiments of the complementary paper tube of FIG. 1.

FIG. 1 is a schematic diagram illustrating a complementary paper tube according to an exemplary embodiment. FIG. 2 illustrates some embodiments of the complementary paper tube of FIG. 1. In the embodiment, the complementary paper tube 100 can be utilized to fill a remaining space left on a surface of a cargo pallet after the cargo pallet being loaded with goods. The complementary paper tube 100 has a plurality of side wall portions 110 which are a first side portion 110a, a second side wall portion 110b, and a pair of third side wall portions 119c, disposed opposite to each other. The first side wall portion 110a and the second side portion 110b are respectively disposed between the third side portions 110c and adjacently connected to the third side wall portions 110 respectively. In addition, the complementary paper tube 100 further includes a straight auxiliary tearing line 152 and a plurality of circular auxiliary tearing lines 156. In the embodiment, the straight auxiliary tearing line 152 surrounds the side wall portions 110. The circular auxiliary tearing lines 156 are disposed on each of the side wall portions 110 and respectively connected to the straight auxiliary tearing line 152. In the embodiment, a width of the straight auxiliary tearing line 152 and the circular auxiliary tearing lines 156 is, for example, 1 millimeter (mm).

As shown in FIG. 1 and FIG. 2, in the embodiment, the circular auxiliary tearing lines 156 of the complementary paper tube 100 respectively separate out circular areas 156a on the first side wall portion 110a, the second side wall portion 110b, and the third side wall portions 110c. A diameter of the circular areas 156a in the embodiment is, for example, 100 millimeter. In addition, the on-site operators who load the goods can knock the centers of the circular areas 156a to first knock off a portion of the edges of the circular areas 156a from the first side wall portion 110a, the second side wall portion 110b, and the third side wall portions 110c and then tear away a portion of the first side wall portion 110a, the second side wall portion 110b, and the third side wall portions 110 inside the circular areas 156a along the circular auxiliary tearing lines 156, so as to form hollow circular openings 156b. Then, the operator can grab upper ends and lower ends of the circular openings 156b respectively and apply forces along directions of an up-pointing arrow and a down-pointing arrow, so as to tear the complementary paper tube 100 into an upper tube 100a and a lower tube 100b along the straight auxiliary tearing line 152.

Figure 3A:
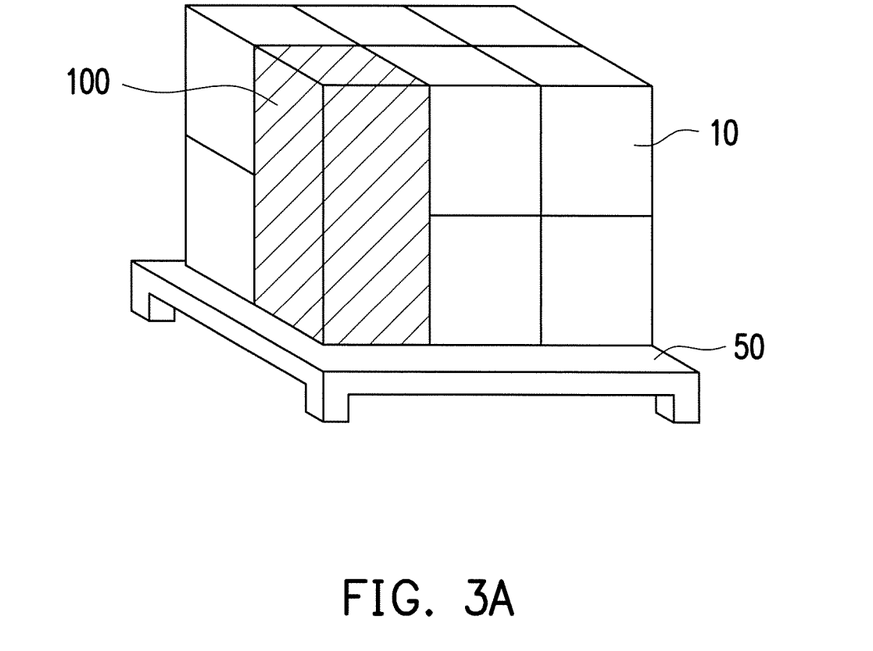
FIG. 3A and FIG. 3B illustrate some embodiments of the complementary paper tube of FIG. 1 on a cargo pallet.
Figure 3B:
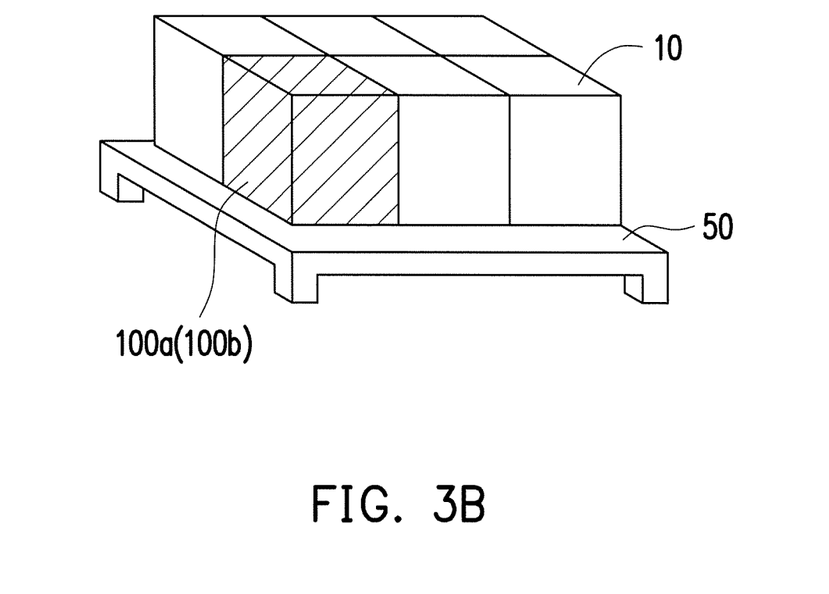

FIG. 3A and FIG. 3B illustrate some embodiments of the complementary paper tube of FIG. 1 on a cargo pallet. In detail, when operators load the boxes 10 with the loaded goods inside on the cargo pallet 50, if there is still remaining loading space on the cargo pallet 50 after the boxes 100 being loaded and no other boxes available for continually filling the remaining loading space or the remaining loading space is not big enough to accommodate at least one or more complete boxes 10, the remaining space on the cargo pallet 50 can be filled with the complementary paper tube 100. When the space on the cargo pallet 50 are fully filled with the complementary paper tubes 100, the boxes 10 loaded with the goods and the complementary paper tube 100 can together form a complete cube, so that the following steps of film wrapping and loading of the cargo pallet 50 and the boxes 10 can be performed in a convenient manner.

For example, as shown in FIG. 3A, when the boxes 10 on the cargo pallet 50 are loaded and stacked in a double-layer manner, the complementary paper tube 110 can be filled in the cargo pallet 50 by its original shape. That is, the surface of the cargo pallet 50 can be directly filled with the complementary paper tubes 100, not to be torn, so as to fill the remaining space on the cargo pallet 50.

As shown in FIG. 3B, as the boxes 10 loaded with goods on the cargo pallet 50 are merely loaded and stacked in a single-layer manner, that is, when the amount of the boxes 10 to be loaded is not enough to be stacked as a double-layer cube, the complementary paper tube 100 can be torn into the upper tube 100a and the lower tube 100b. In addition, one of the upper tube 100a and the lower tube 100b can be filled into the above-mentioned remaining space on the surface of the cargo pallet 50. The upper tube 100a and the lower tube 100b are together with the boxes 10 to form a complete single-layer cube.

In the embodiment, sizes and structures of the upper tube 100a and lower tube 100b torn from the complementary paper tube 100 may be the same. However, in another embodiment, not illustrated, the complementary paper tube 100 may be torn into the upper tube 100a and the lower tube 100b with different sizes and structures. In addition, numbers and sizes of the tubes torn from the complementary paper tube 100 can be adjusted according to the practical needs of the field operations.

In the embodiment, the complementary paper tube 100 has a plurality of the circular auxiliary tearing lines 156 respectively disposed on the first side wall portion 100a, the second side wall portion 100b, and the third side wall portions 100c, and the straight auxiliary tearing line 152 surrounds the first side wall portion 100a, the second side wall portion 100b, and the third side wall portions 100c and connects to the circular auxiliary tearing lines 156. Accordingly, the operators can tear the complementary paper tube 100 into the upper tube 100a and the lower tube 100b barehandedly through the aid of the straight auxiliary tearing line 152 and circular auxiliary tearing lines 156. In other words, the on-site operators have no needs to rely on other cutting tools to cut or tear the complementary paper tube 100, so as the prevent hazard to the on-site operators, which may be caused by usage of the cutting tools.

Referring again to FIG. 1 and FIG. 2, the complementary paper tube 100 may have a plurality of rhombus-shaped openings 153 disposed at each of the edges of the complementary paper tube 100, and the rhombus-shaped openings 153 are connected to the above-mentioned straight auxiliary tearing line 152. That is, as shown in FIG. 2, the rhombus-shaped openings 153 are located at intersections of the edges of the complementary paper tube 100 and the straight auxiliary tearing line 152, and the rhombus-shaped openings 153 are, for example, equilateral quadrilateral openings. In the embodiment, the rhombus-shaped openings 153 can prevent stress and deformation to be produced at some parts of the straight auxiliary tearing line 152 passing through the edges of the complementary paper tube 100 after the complementary paper tube 100 being folded and formed, which results in that the complementary paper tube 100 cannot be torn apart along the straight auxiliary tearing line 152. Accordingly, the operators may have to apply an excessive force to tear the complementary paper tube 100 into an upper tube 100a and a lower tube 100b, so that the complementary paper tube 100 may not be torn along the straight auxiliary tearing line 152.

Figure 4A:
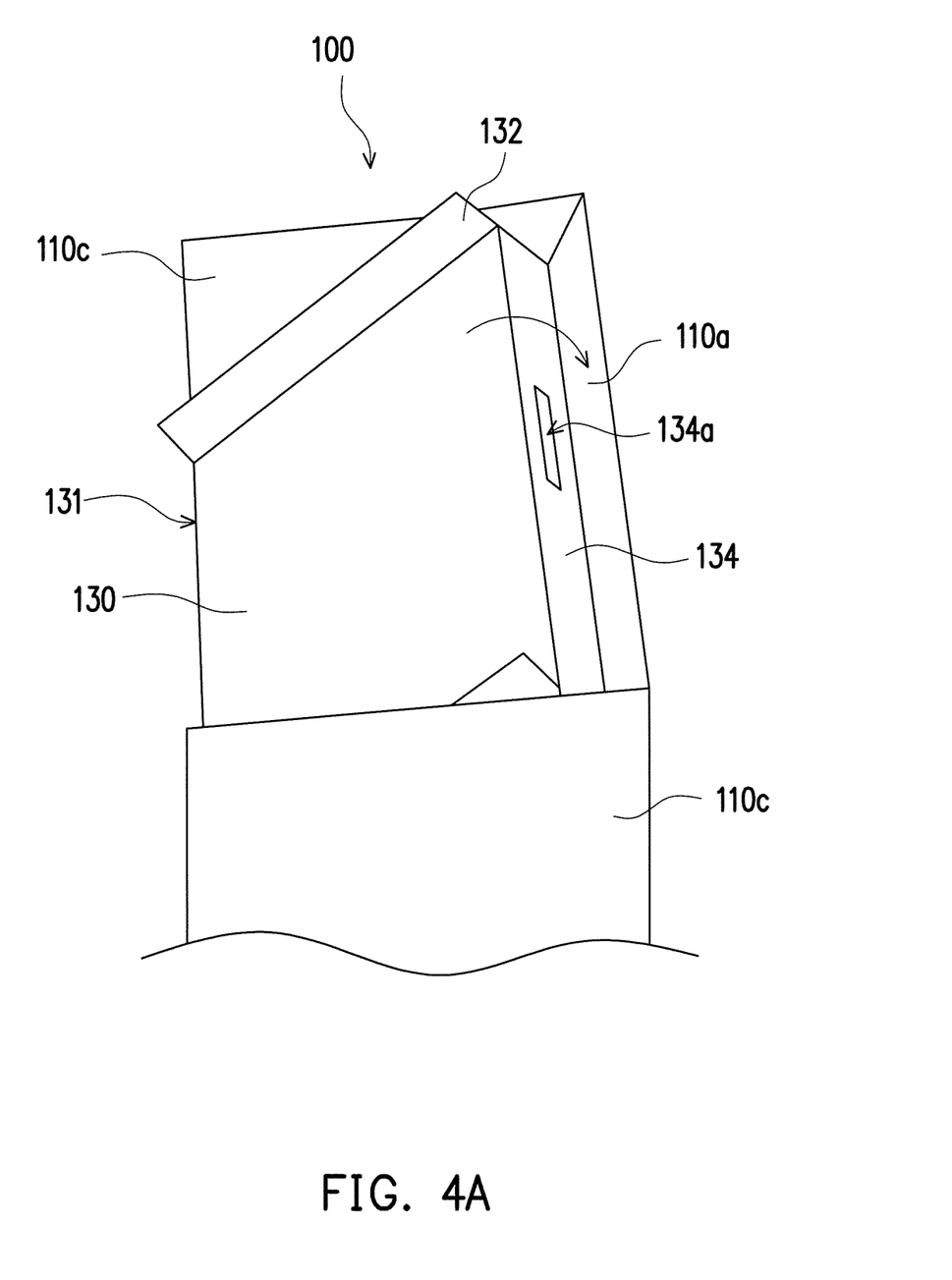
FIG. 4A and FIG. 4B are schematic diagrams illustrating some parts of the complementary paper tube of FIG. 1.
Figure 4B:
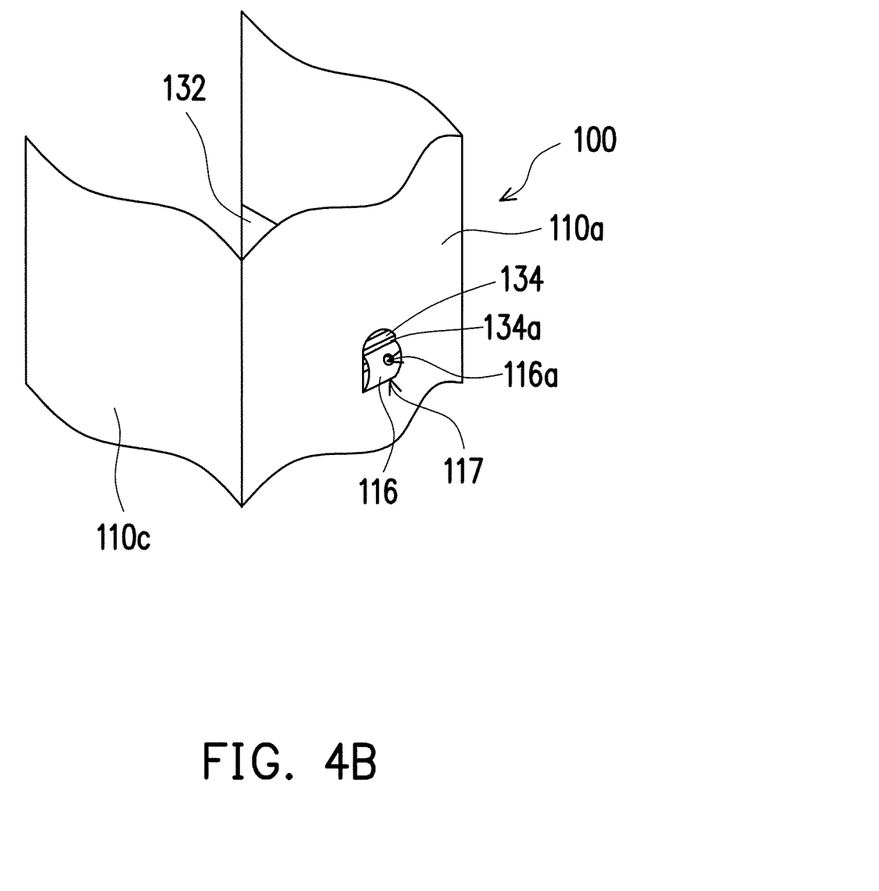

FIG. 4A and FIG. 4B are a schematic diagrams illustrating some parts of the complementary paper tube of FIG. 1. As shown in FIG. 4A, in the embodiment, the complementary paper tube 100 has a pair of cover portions 130 disposed at a top opening and a bottom opening of the complementary paper tube 100 (the top opening of the complementary paper tube 100 is illustrated in FIG. 4A as example for explanation), and the cover portions 130 are connected to the second side wall portion 110b along folding lines 131. In FIG. 4A, the cover portion 130 can be folded toward a direction of the inner side of the first side wall portion 110a and the complementary paper tube 100 (the pointing direction of the arrow in FIG. 4), so as to cover the top opening and the bottom opening of the complementary paper tube 100. Accordingly, a structural support can be formed among the first side wall portion 110a, the second side wall portion 110b, and the third wall portions 110c, so as to prevent the first side wall portion 110a, the second side wall portion 110b or the third side wall portions 110c to cave from outside toward inside of the complementary paper tube 100.

In the embodiment, the cover portion 130 has the first folding portions 132, parallel to each other and respectively disposed at its two sides (i.e., the two sides adjacent to the third folding portions 110c) perpendicular to the folding lines 131. The first folding portions 132 of the cover portion 130 of can be folded upwardly, so as to increase the contact and friction area between the cover portion 130 and the adjacent third side wall portions 110c and to provide a better structural support for the third side wall portions 110c. In addition, the cover portion 130 has a second folding portion 131 at a side (i.e., the side corresponding to the first side wall portion 110a) parallel to the folding line 131, and the second folding portion 134 can be folded along the pointing direction of the arrow in FIG. 4 toward the first side wall portion 110a and the bottom portion of the complementary paper tube 100.

Referring to the FIG. 4A and FIG. 4B, the second folding portion 134 has an inserting hole 134a, and a portion of the first side wall portion 110a, corresponding to the second folding portion 143, has an inserting portion 115 that is, for example, a plugging tongue. As shown in FIG. 4B, the inserting portion 116 may be folded inwardly along the folding line 117 on the first side wall portion 110a (i.e., to be folded from the outside to the inside of the first side wall portion 110a) and inserted into the inserting hole 134a of the second folding portion 134, so as to fix the cover 130 among the first side wall portion 110a and the third side wall portions that are opposed and parallel to each other. Accordingly, the top opening of the complementary paper tube 100 is covered, and a structural support is formed among the first side wall portion 110a, the second side wall portion 110b and the third side wall portion 110c.

In detail, the inserting portion 116 located on the first side wall portion 110a has a round hole 116a. When the cover portion 110a and the second folding portion 134a thereof are folded into the inner side of the complementary paper tube 100 along the pointing direction of the arrow in FIG. 4A, the operators may stretch out fingers into the inner side of the first side wall portion 100a through the round hole 116a, and press the inserting portion 116 embedded therein, so as to fold and pull out the inserting portion 116 toward the outer side of the first side wall portion 110a along the folding line 117. The opening, formed on the first side wall portion 110 after the inserting portion 116 being pulled out, exposes the inserting hole 134a of the second inserting portion 134. Then, the on-site operators can again fold the inserting portion 116 toward the inner side of the first side wall portion 110a, so as to expose a portion of the inserting portion 116 in the inserting hole 134a of the first side wall portion 110a.

Figure 5:
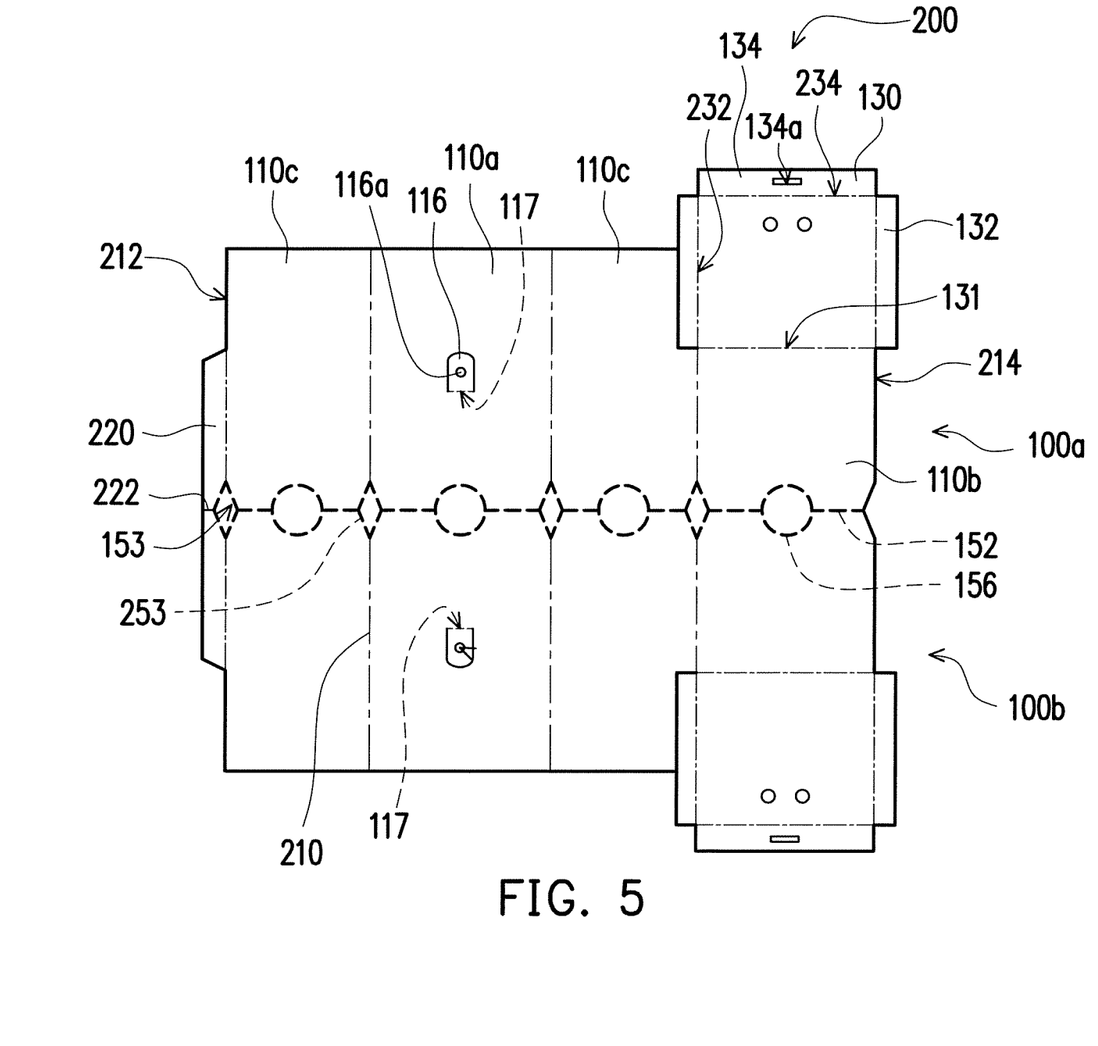
FIG. 5 is a schematic diagram illustrating a flat plate for forming the complementary paper tube of FIG. 1.

FIG. 5 is a schematic diagram illustrating a flat plate for forming the complementary paper tube of FIG. 1. Referring to FIG. 5, a flat plate 200 has a plurality of folding lines 210 parallel to each other. The folding lines 210 separate out the above-mentioned first side wall portion 110a, the second side wall portion 100b, the third side wall portions 110c and an adhering portion 220 of the complementary paper tube 100 on the flat plate 200. In the embodiment, the flat plate 200 may be folded along the folding lines 210, and the two side portions 212, 214, oppositely and parallel located, of the flat plate 200 may be bonded through the adhering portion 220. That is, the second side wall portion 110b is attached to the adhering portion 220, and the flat plate 200 is folded along the folding line 210, so as to form the first side wall portion 110a, the second side wall portion 110b and the third side wall portions 110c around the complementary paper tube 100.

The flat plate 200 has the above-mentioned straight auxiliary tearing line 152. The straight auxiliary tearing line 152 and the folding lines 210 are perpendicularly disposed on the flat plate 200, and the straight auxiliary tearing line 152 separates out the upper tube 100a and the lower tube 100b on the flat plate 200. In addition, the flat plate 200 has the above-mentioned circular auxiliary tearing lines 156 and the rhombus-shaped openings 153. The circular auxiliary tearing lines 156 is disposed between the folding line 210 and connected to the straight auxiliary tearing line 152 on the first side wall portion 110a, the second side wall portion 110b, and the third side wall portions 110c. Moreover, the rhombus-shaped openings 153, the straight auxiliary tearing line 152, and the folding lines 210 are connected with each other.

In the embodiment, the middle of the adhering portion 220 has a cutting line 222, perpendicular to the folding line 210 and connected to the rhombus-shaped openings 153 and the straight auxiliary tearing line 152. Owing to the configuration of the cutting line 222, as the complementary paper tube 100 is torn into the upper tube 100a and the lower tube 100b, the upper tube 100a and the lower tube 100b can be directly torn apart along the straight auxiliary tearing line 152, such that the upper tube 100a and the lower tube 100b are not connected with each other through the adhering portion 220 anymore and no need of being further cut by the on-site operators through cutters or other equipment, or the connection portion of the above-mentioned adhering portion 220 has to be torn apart by the on-site operators through further applying forces.

In addition, the flat plate 200 is separated into the above-mentioned cover portions 130 respectively at the upper and lower sides of the second side wall portion 110b along the folding line 131. In the embodiment, a side of the cover portion 130 is connected with the second side wall portion 110b through the folding line 131, and the rest sides of the cover portion 130 are apart from and not connected with the second side wall portion 110b and the third side wall portions 110c adjacent thereto. The cover portion 130 has a pair of the folding lines 232 parallel to each other and perpendicular to the folding line 131. In addition, the cover portion 130 also has a folding line 234 parallel to the folding line 131. The folding line 232 separates out the above-mentioned first folding portion 132 on the cover portion 130, and the folding line 234 can separate out the above-mentioned second folding portion 134 having the inserting hole 134a.

As shown in FIG. 5, the cover portion 130 can be folded relative to the second side wall portion 110b along the folding line 131, so as to cover the top opening or the bottom opening of the complementary paper tube 100 as shown in FIG. 4. In addition, after the first folding portion 132 being folded along the folding line 232, the first folding portion 132 can abut on the third side wall portion 110c of the complementary paper tube 100. Moreover, the second folding portion 134 on the flat plate 200 can be folded along the folding line 234, so as to abut on the first side wall portion 110a of the complementary paper tube 100 as shown in FIG. 4A and FIG. 4B.

In the embodiment, the flat plate also has a plurality of rhombus-shaped auxiliary tearing lines 253 connected to the folding lines 210 and the straight auxiliary tearing lines 152. That is, the rhombus-shaped auxiliary tearing lines 253 are located at the intersection of the folding lines 210 and the straight auxiliary tearing lines 152. The rhombus-shaped auxiliary tearing lines 253 separate out the above-mentioned rhombus-shaped openings 153 on the flat plate 200. In the embodiment, the operators can first remove a portion of the flat plate 200 surrounded by rhombus-shaped auxiliary tearing lines 253 before folding the flat plate 200 along the folding lines 210, so as to form the above-mentioned rhombus-shaped openings 153. The rhombus-shaped openings 153 can prevent the stress accumulated at each of the edges of the complementary paper tube 100 after the flat plate 200 being folded into the complementary paper tube 100 along the folding lines 210 by the operator, such that the deformation generated at a portion of the straight auxiliary tearing line 152 passing through the edges, which results in that the complementary paper tube 100 cannot be torn into the upper tube 100a and the lower tube 100b along the straight auxiliary tearing line 152, can be prevented.

In the embodiment, the flat plate 200 also has folding lines 117, respectively perpendicular to the folding lines 210 and disposed at the upper and lower sides of the straight auxiliary tearing line 152 of the first side wall portion 110a. The inserting portion 116 in the above-mentioned FIG. 4B is connected to the first side wall portion 110a through the folding line 117, so as to embed the inserting portion 116 in the first side wall portion 110a.

To sum up, in the embodiments of the present invention, the flat plate can be folded to form the complementary paper tube, so as to fill the excessive remaining space on the cargo pallet. The complementary paper tube has a straight auxiliary tearing line surrounding the side wall portions thereof and the circular auxiliary tearing lines connected to the straight auxiliary tearing line. In addition, the complementary paper tube has the rhombus-shaped openings respectively located at the edges thereof, and the rhombus-shaped openings are connected to the straight auxiliary tearing line and the circular auxiliary tearing lines. In the embodiments of the present invention, the circular openings can be firstly formed through removing the circular areas surrounded by the circular auxiliary tearing lines by the on-site operators who are responsible for loading the goods, and then the complementary paper tube is torn into the upper tube and the lower tube through the circular openings and the straight auxiliary tearing line. In addition, the rhombus-shaped openings at the edges of the complementary paper tube can prevent the stress accumulated at the edges after the flat plate is folded into the complementary paper tube, so as to prevent the deformation generated at a portion of the straight auxiliary tearing line passing through the edges, which causes that the complementary paper tube cannot be torn into the upper tube and the lower tube along the straight auxiliary tearing line by on-site operators.

The complementary paper tube of the embodiments of the present invention can be torn into the tubes with different heights according to the stacking layers of the boxes on the cargo pallet, and the on-site operators can directly tear apart the complementary paper tube barehandedly without relying on the aid of the relevant cutters, so as to prevent jeopardizing the safety of the field operation due to usage of the cutters.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A complementary paper rectangular tube, adapted to fill a remaining space on a cargo pallet, comprising:
   a plurality of side wall portions, disposed adjacently to each other;
   at least one straight auxiliary tearing line, surrounding the plurality of side wall portions; and
   a plurality of circular auxiliary tearing lines, disposed on the side wall portions and respectively connected to the at least one straight auxiliary tearing line, wherein a portion of an area of each of the plurality of side wall portions is respectively surrounded by the circular auxiliary tearing lines and adapted to be torn away, so as to form a plurality of circular openings, and the complementary paper rectangular tube is adapted to be torn into an upper rectangular tube and a lower rectangular tube through the circular openings and the at least one straight auxiliary tearing line.

2. The complementary paper rectangular tube according to claim 1, further comprising a plurality of rhombus-shaped openings, respectively located at a plurality of corners of the complementary paper rectangular tube, and the rhombus-shaped openings respectively connected to the at least one straight auxiliary tearing line and the circular auxiliary tearing lines.

3. The complementary paper rectangular tube according to claim 1, further comprising a pair of cover portions, respectively covering a top portion and a bottom portion of the complementary paper rectangular tube.

4. The complementary paper rectangular tube according to claim 3, wherein the pair of the cover portions respectively have inserting holes, and at least one of the side wall portions has a plurality of inserting portions disposed corresponding to the inserting holes, the inserting portions are adapted to be inserted into the inserting holes respectively, so as to respectively hold the pair of the cover portions among the side wall portions.

5. The complementary paper rectangular tube according to claim 1, wherein sizes and structures of the upper rectangular tube and the lower rectangular tube are substantially the same.

6. A flat plate, adapted to form the complementary paper rectangular tube according to claim 1, the flat plate comprising a plurality of first folding lines, the first folding lines parallel to each other, perpendicular to the at least one straight auxiliary tearing line, and separating out the side wall portions and an adhering portion on the flat plate, wherein the circular auxiliary tearing lines are respectively located between the adjacent first folding lines and separate out the circular openings on the flat plate, the flat plate is adapted to be folded along the first folding lines and one of the side wall portions is adapted to be adhered on the adhering portion, so as to form the complementary paper rectangular tube.

7. The flat plate according to claim 6, further comprising a plurality of rhombus-shaped auxiliary tearing lines, disposed at intersections of the first folding lines and the straight auxiliary tearing line, and the rhombus-shaped auxiliary tearing lines separating out rhombus-shaped openings on the flat plate.

8. The flat plate according to claim 6, further comprising a pair of second folding lines, disposed at two opposite sides of one of the side wall portions and perpendicular to the first folding lines, wherein the pair of the second folding lines separate out a pair of cover portions on the flat plate.

9. The flat plate according to claim 8, further comprising a plurality of third folding lines, respectively perpendicular to the first folding lines, wherein the flat plate has a plurality of inserting portions, foldably embedded on one of the side wall portions through the third folding lines, and the inserting portions are adapted to be folded and inserted into inserting holes.

10. The flat plate according to claim 8, wherein the at least one straight auxiliary tearing line and the circular auxiliary tearing lines together separate out the upper rectangular tube and the lower rectangular tube on the flat plate.

* * * * *